(12) United States Patent
Fu et al.

(10) Patent No.: US 10,887,905 B2
(45) Date of Patent: *Jan. 5, 2021

(54) METHOD AND APPARATUS FOR RECEIVING A COMMON SIGNALING IN A WIRELESS COMMUNICATION SYSTEM

(71) Applicant: Samsung Electronics Co., Ltd., Suwon-si (KR)

(72) Inventors: Jingxing Fu, Beijing (CN); Bin Yu, Beijing (CN); Chen Qian, Beijing (CN); Qi Xiong, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/666,101

(22) Filed: Oct. 28, 2019

(65) Prior Publication Data
US 2020/0068604 A1 Feb. 27, 2020

Related U.S. Application Data

(63) Continuation of application No. 15/659,484, filed on Jul. 25, 2017, now Pat. No. 10,462,809.

(30) Foreign Application Priority Data

Jul. 25, 2016 (CN) .......................... 2016 1 0590991

(51) Int. Cl.
*H04W 72/12* (2009.01)
*H04L 5/00* (2006.01)
*H04W 24/02* (2009.01)

(52) U.S. Cl.
CPC ....... *H04W 72/1273* (2013.01); *H04L 5/0044* (2013.01); *H04L 5/0048* (2013.01);
(Continued)

(58) Field of Classification Search
CPC ..... H04W 12/04; H04W 84/12; H04W 28/26; H04W 72/0453; H04W 88/06;
(Continued)

(56) References Cited

U.S. PATENT DOCUMENTS 10,462,809 B2 * 10/2019 Fu .................. H04L 5/0048
2013/0242912 A1  9/2013 Wu
(Continued)

OTHER PUBLICATIONS

International Search Report dated Oct. 20, 2017 in connection with International Patent Application No. PCT/KR2017/008001, 3 pages.
(Continued)

*Primary Examiner* — Diane D Mizrahi

(57) ABSTRACT

The present disclosure relates to a pre-5th-Generation (5G) or 5G communication system to be provided for supporting higher data rates Beyond 4th-Generation (4G) communication system such as Long Term Evolution (LTE). The present disclosure provides method and apparatus for receiving a common signaling. According to the various embodiments of the present disclosure, a method of a terminal for receiving a common signaling comprises determining a reception mode of a common signaling based on a maximum bandwidth supported by the terminal, and receiving, by the terminal, the common signaling based on the determined reception mode.

20 Claims, 17 Drawing Sheets

(52) U.S. Cl.
CPC .......... *H04L 5/0053* (2013.01); *H04L 5/0023* (2013.01); *H04W 24/02* (2013.01)

(58) Field of Classification Search
CPC .............. H04W 72/1273; H04W 24/02; H04L 5/0026; H04L 5/0041; H04L 5/0046; H04L 5/0053; H04L 5/0092; H04L 5/0048; H04L 5/0051; H04L 5/0044; H04L 5/0023

See application file for complete search history.

(56) References Cited

U.S. PATENT DOCUMENTS

| | | |
|---|---|---|
| 2014/0301335 A1 | 10/2014 | Shi et al. |
| 2015/0181560 A1 | 6/2015 | Jamadagni et al. |
| 2015/0245378 A1 | 8/2015 | Kim et al. |
| 2015/0304925 A1 | 10/2015 | Hwang et al. |
| 2016/0127918 A1 | 5/2016 | Yi et al. |
| 2016/0269212 A1* | 9/2016 | Vilaipornsawai ... H04L 27/2627 |
| 2017/0019911 A1 | 1/2017 | Rico Alvarino et al. |
| 2017/0331577 A1 | 11/2017 | Parkvall et al. |
| 2017/0331670 A1 | 11/2017 | Parkvall et al. |
| 2019/0222376 A1* | 7/2019 | Wu ................... H04W 72/0453 |

OTHER PUBLICATIONS

Written Opinion of the International Searching Authority dated Oct. 20, 2017 in connection with International Patent Application No. PCT/KR2017/008001, 6 pages.

\* cited by examiner

METHOD AND APPARATUS FOR RECEIVING A COMMON SIGNALING IN A WIRELESS COMMUNICATION SYSTEM

CROSS-REFERENCE TO RELATED APPLICATIONS

This application is a continuation of U.S. patent application Ser. No. 15/659,484 filed on Jul. 25, 2017, which is related to and claims priority to Chinese Application No. 201610590991.2 filed on Jul. 25, 2016, the disclosures of which are herein incorporated by reference in their entirety.

BACKGROUND

1. Field

The present disclosure relates to a wireless communication system, and more specifically, relates to method and apparatus for receiving a common signaling in a wireless communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In LTE systems, a user equipment (UE) capability may support the entire system bandwidth. As a bandwidth of a frequency band is increased, the system bandwidth is also increased. However, some UEs may have difficulty supporting such large bandwidth to receive signals from eNodeB (eNB).

SUMMARY

To address the above-discussed deficiencies, it is a primary object to provide common signal receiving methods and apparatuses, so as to solve a problem how each UE correctly receives common signaling in cases that each UE supports a different system bandwidth.

The present disclosure provides a common signal receiving method, which includes determining a reception mode of common signaling according to a maximum bandwidth supported by a UE (User Equipment). The method further includes receiving, by the UE, the common signaling according to the determined reception mode.

Preferably, for a case that one set of the common signaling is transmitted in a system bandwidth and the set of the common signaling is transmitted in one frequency band range within the system bandwidth, the process of determining the reception mode of the common signaling according to the maximum bandwidth supported by the UE includes determining the reception mode according to at least one of methods A-E:

method A: when the maximum bandwidth supported by the UE is larger than or equal to the system bandwidth, receiving, by the UE, data, UE specific signaling and common signaling on all or part of the frequency resources of the system bandwidth.

method B: when the maximum bandwidth supported by the UE is smaller than the system bandwidth, receiving, by the UE, the data, the UE specific signaling and the common signaling on frequency resources which include a frequency band available for common signaling transmission and are within a bandwidth smaller than or equal to the maximum bandwidth supported by the UE.

method C: when the maximum bandwidth supported by the UE is smaller than the system bandwidth, receiving, by the UE, the data and the UE specific signaling on frequency resources which do not include the entire frequency band available for the common signaling transmission and are within the bandwidth smaller than or equal to the maximum bandwidth supported by the UE. The method further includes performing the reception of the common signaling and the reception of the data and the UE specific signaling through time-division multiplexing.

method D: when the maximum bandwidth supported by the UE is smaller than the system bandwidth, receiving, by the UE, the data and the UE specific signaling on frequency resources which does not include the frequency band available for common signaling transmission and is within the bandwidth smaller than or equal to the maximum bandwidth supported by the UE. The method further includes performing the reception of the common signaling and the reception of the data and the UE specific signaling through time-division multiplexing.

method E: when the maximum bandwidth supported by the UE is smaller than the system bandwidth, receiving, by the UE, the data and the UE specific signaling on frequency resources that include the frequency band available for common signaling transmission and are within a bandwidth smaller than or equal to the maximum bandwidth supported by the UE. The method further includes, when there is an overlapped part between the frequency band for the UE data reception and the frequency band for the common signaling reception, receiving the data and the UE specific signaling in the overlapped part. Otherwise, the method includes performing the reception of the common signaling and the reception of the data and the UE specific signaling through time-division multiplexing.

Preferably, the performing the reception of the common signaling and the reception of the data and the UE specific signaling through time-division multiplexing includes receiving, by the UE, the common signaling in the frequency band for the common signaling transmission in a first category of subframes according to configuration through higher-layer signaling. The method further includes receiving the data and the UE specific signaling in the frequency band for data transmission in a second category of subframes outside the first category of the subframes according to configuration through the higher-layer signaling.

Preferably, the performing the reception of the common signaling and the reception of the data and the UE specific signaling through time-division multiplexing includes receiving, by the UE, the common signaling in the frequency band for common signaling transmission in a candidate subframe for the common signaling reception. The method further includes receiving the data and the UE specific signaling in the frequency band for data transmission in a subframe outside the candidate subframe for the common signaling reception.

Preferably, the performing the reception of the common signaling and the reception of the data and the UE specific signaling through time-division multiplexing includes receiving, by the UE, a common signaling reception indication in the frequency band for the data transmission. The method further includes determining whether to receive the common signal in the corresponding candidate subframe for the common signaling reception in the frequency band for the common signaling transmission according to the common signaling reception indication. The method additionally includes receiving, by the UE, the data and the UE specific signaling in the frequency band for the data transmission in a subframe outside the candidate subframe for the common signaling reception.

Preferably, the process of the UE receiving the common signaling reception indication in the frequency band for the data transmission and determining whether to receive the common signal in the corresponding candidate subframe for the common signaling reception in the frequency band for the common signaling transmission according to the common signaling reception indication includes at least one of methods as follows:

determining, by the UE, the candidate subframe for the common signaling reception according to configuration through higher-layer signaling or according to a predetermined rule, receiving the common signaling reception indication in the candidate subframe for the common signaling reception, and determining whether to receive the common signaling in the frequency band for the common signaling transmission in the current subframe according to the common signaling reception indication.

determining, by the UE, the candidate subframe for the common signaling reception according to configuration through higher-layer signaling or the predetermined rule, receiving the common signaling reception indication in a closest downlink subframe before the candidate subframe for the common signaling reception, and determining whether to receive the common signaling in the frequency band for the common signaling transmission in a first candidate subframe for the common signaling reception after the downlink subframe according to the common signaling reception indication.

determining, by the UE, a subframe for the common signaling reception indication reception according to configuration of higher-layer signaling, receiving the common signaling reception indication in the determined subframe, and determining whether to receive the common signaling in the frequency band for the common signaling transmission in the candidate subframe for the common signaling reception within a set time period after the subframe according to the common signaling reception indication.

Preferably, the method further includes performing a process according to at least one method as follows when the UE does not receive the common signaling reception indication in the subframe for common signaling reception indication reception: not receiving, by the UE, the common signaling when the UE does not receive the common signaling reception indication, or receiving, by the UE, the common signaling when the UE does not receive the common signaling reception indication.

Preferably, the common signaling reception indication is an indication applying to all categories of the common signaling, or common signaling reception indications are divided into categories, and different categories respectively apply to corresponding categories of the common signaling.

Preferably, the candidate subframe for the common signaling reception includes at least one subframe as follows: a subframe in which the base station transmits MIB, a subframe in which the base station transmits SIB1, a subframe indicated through SIB1 to transmit another SIB, a subframe configured for UE to transmit paging information by the base station, or a subframe configured for UE to transmit random access response information by the base station.

Preferably, in the case that at least two sets of common signaling are transmitted in the system bandwidth, each set of the common signaling is transmitted in a different frequency band range, and information carried in each set of the common signaling is the same. The process of the UE receiving the common signaling according to the determined reception mode preferably includes at least one method as follows:

when the maximum bandwidth supported by the UE is larger than or equal to the system bandwidth, receiving, by the UE, the data and the UE specific signaling on all or part of the frequency resources of the system bandwidth, and receiving any set of the common signaling;

when the maximum bandwidth supported by the UE is smaller than the system bandwidth, receiving, by the UE, the data, the UE specific signaling and the common signaling in frequency resources within a bandwidth smaller than or equal to the maximum bandwidth supported by the UE, and receiving, by the UE, any set of the common signaling when more than one set of the common signaling are transmitted in the frequency band for the UE data reception.

The present disclosure provides a common signal receiving apparatus, which includes a mode determining module, to determine a reception mode of common signaling according to a maximum bandwidth supported by a UE (User Equipment). The apparatus further includes a receiving module, to receive the common signaling according to the determined reception mode.

It can be seen from the above technical solution that, the present disclosure provides a common signaling receiving method, in this method, a reception mode of common signaling is determined according to a maximum bandwidth supported by a UE, the UE receives the common signaling according to the determined reception mode, so that UE supporting various bandwidths can receive the common signaling according to corresponding methods, and a problem that how each UE correctly receives common signaling in cases that each UE supports a different system bandwidth is solved.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The present disclosure will be described in further detail hereinafter with reference to accompanying drawings and embodiments to make the objective, technical solution and merits therein clearer.

According to the various embodiments of the present disclosure, method and apparatus for receiving a common signaling in user equipment (UE) is provided. Hereinafter, the UE can be referred to as a 'terminal'.

Figure 1:
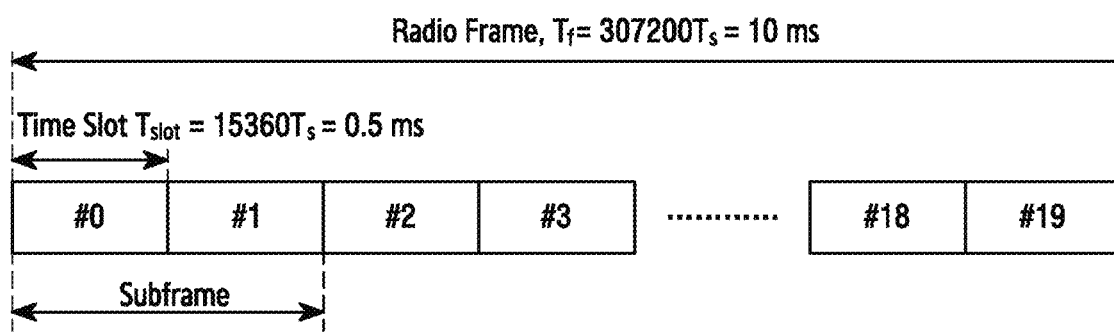
FIG. 1 is a schematic diagram illustrating a frame structure in existing FDD system.

FIG. 1 is a schematic diagram illustrating a frame structure in a Frequency Division Duplex (FDD) system. As shown in FIG. 1, each downlink subframe includes two time slots, for normal cyclic prefix (CP) length, each time slot includes 7 Orthogonal Frequency Division Multiplexing (OFDM) symbols; for extended CP length, each time slot includes 6 OFDM symbols.

Figure 2:
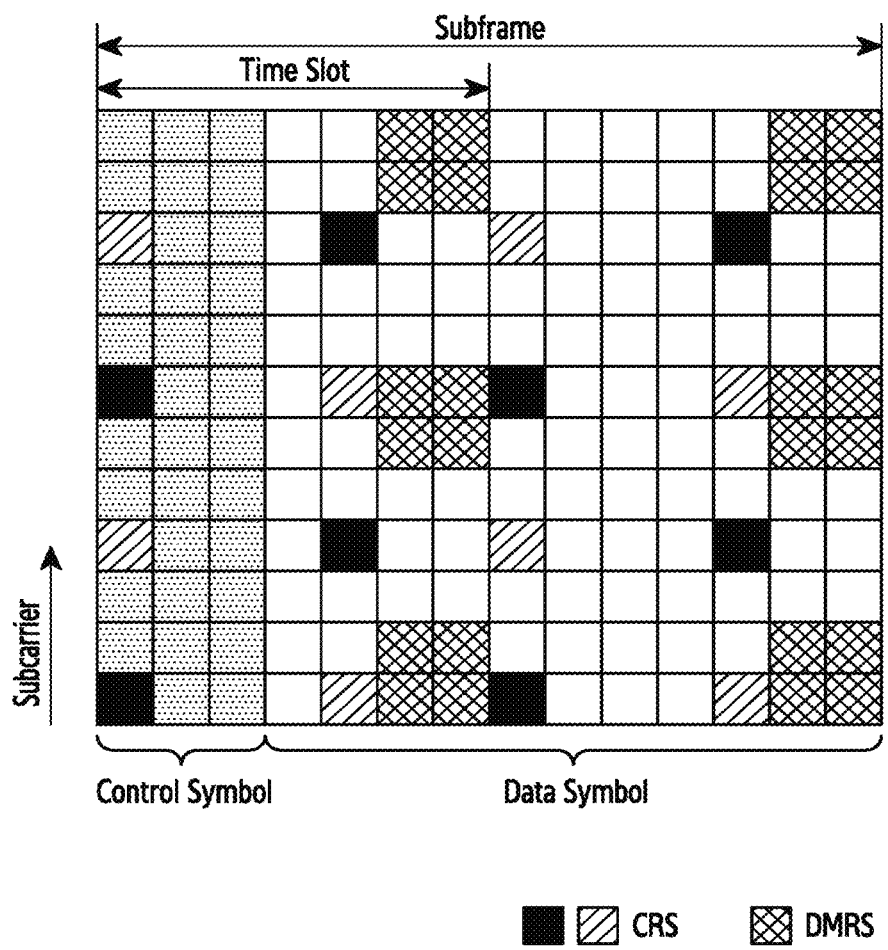
FIG. 2 is a schematic diagram illustrating a frame structure in existing LTE systems.

FIG. 2 is a schematic diagram illustrating a frame structure in LTE systems. As shown in FIG. 2, first n OFDM symbols are used to transmit downlink control information including Physical Downlink Control Channel (PDCCH) and Other control information, where n is equal to 1, 2, or 3; the remaining OFDM symbols are used to transmit Physical Downlink Shared Channel (PDSCH). A basic granularity of resource allocation is a physical resource block (PRB) pair. A PRB contains 12 consecutive subcarriers in frequency, and corresponds to a time slot in time. A PRB pair includes two PRBs within two time slots in a same subcarrier in a subframe. In each PRB pair, each Resource Element (RE) is a minimum unit of time-frequency resources, i.e., each RE is a subcarrier in frequency, and is an OFDM symbol in time. REs can be respectively used for different functions. For example, a part of the REs can be used to transmit a Cell-specific Reference Signal (CRS), a user-specific Demodulation Reference Signal (DMRS), Channel State Information-Reference Signal (CSI-RS), a physical Downlink Control Channel (PDCCH), a Physical Downlink Shared Channel (PDSCH), etc.

In LTE systems, PDSCH transmission and PUSCH transmission are performed through PDCCH scheduling or Enhanced Physical Downlink Control Channel (EPDCCH) scheduling, wherein resources for the PDSCH transmission and the PUSCH transmission are also allocated by resource allocation signaling in the PDCCH/EPDCCH, a largest resource allocated for the PDSCH transmission and the PUSCH transmission includes all PRB pairs in the entire system bandwidth, smallest resources allocated for the PDSCH transmission and the PUSCH transmission is one PRB pair in the entire system bandwidth, and a granularity of resource allocation is one PRB pair. The number of bits of the resource allocation signaling in the PDCCH/EPDCCH is calculated according to the number of all PRB pairs in the entire system bandwidth. For example, when the system bandwidth is 10 MHz and the number of PRB pairs is 50, the number of bits of the resource allocation signaling used in the PDCCH/EPDCCH is calculated by using different resource allocation methods according to the number of PRB pairs 50.

In LTE systems, for the PDCCH transmission, a common search space and a UE specific search space are defined. In the common search space, all UEs can perform demodulation and decoding. In the UE specific search space, a specific UE can perform demodulation and decoding. The process of tracking the PDCCH includes: performing tentative demodulation and tentative decoding for configured common search spaces and configured UE specific search spaces of all candidate PDCCHs, checking the scrambled Cyclic Redundancy Check (CRC) by using a corresponding Radio Network Temporary Indicator (RNTI) (such as C-RNTI), and finally search out the PDCCH scheduled by a base station.

At present, system information transmitted in LTE systems includes: a Master Information Block (MIB) transmitted in Physical Broadcasting Channel (PBCH), where the MIB is transmitted in 6 middle PRBs of a serving cell; and a System Information Block (SIB) transmitted in PDSCH, where the SIB can be scheduled through PDCCH, and can be transmitted in the entire system bandwidth. In addition, Paging information and Random Access Channel (RACH) are also scheduled in the common search space.

Figure 3:
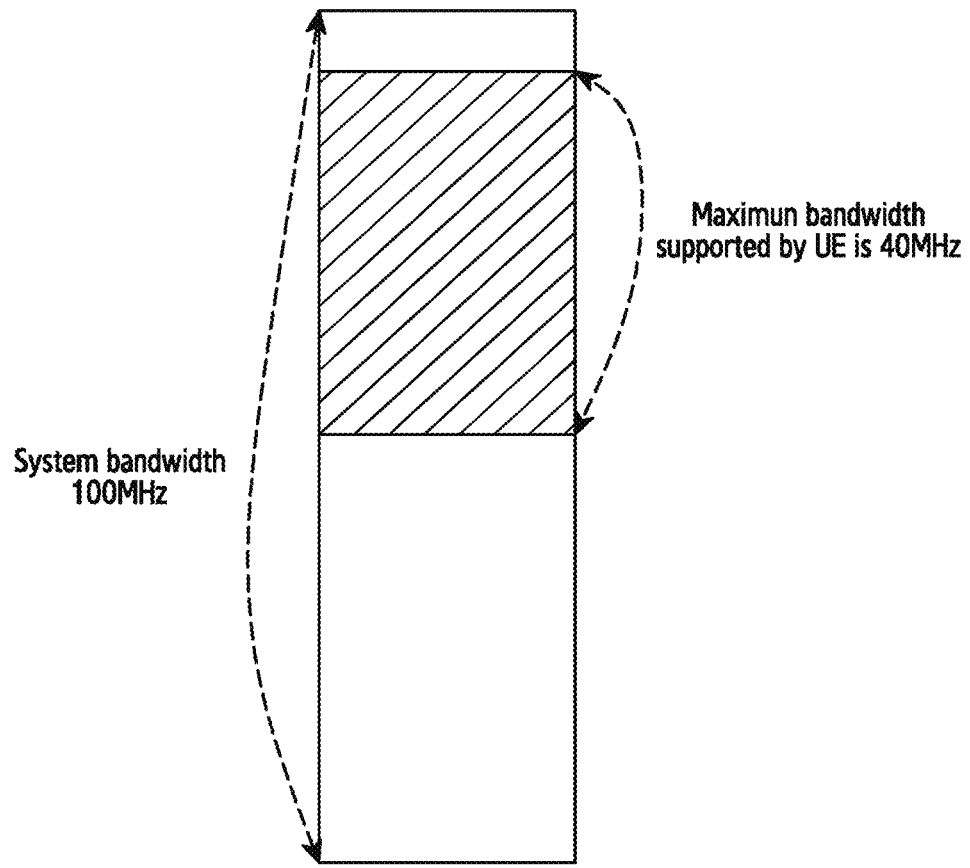
FIG. 3 is a schematic diagram illustrating that maximum bandwidth supported by a UE is smaller than system bandwidth.

In LTE systems, UE capability can support the entire system bandwidth. In new radio access technology (NR), since bandwidth of a frequency band is greatly improved, system bandwidth is also greatly improved. However, some UEs may not support such large system bandwidth, and the maximum system bandwidth supported by different UEs may be different. In an example as shown in FIG. 3, the system bandwidth is 100 MHz, and the maximum bandwidth supported by the UE is 40 MHz. The present disclosure mainly studies a method for receiving system information and information scheduled in common search space in cases that UEs support different system bandwidth.

Figure 4:
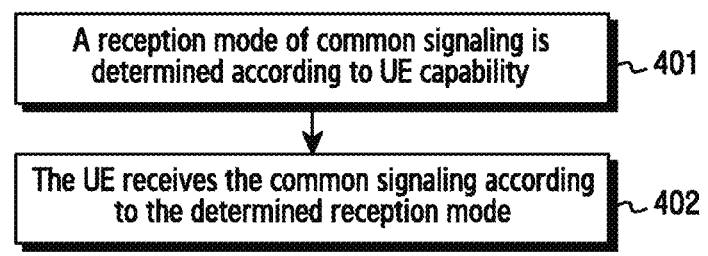
FIG. 4 is a flowchart illustrating a common signaling receiving method according to an embodiment of the present disclosure.

To achieve the intended purpose of the present disclosure, the present disclosure provides a common signaling receiving method, as shown in FIG. 4, the method includes procedures as follows:

At block 401, a reception mode of common signaling is determined according to UE capability.

The UE capability refers to a frequency bandwidth processing capability of the UE, i.e., a maximum frequency bandwidth that can be simultaneously processed by the UE, i.e. a maximum bandwidth supported by the UE.

The common signaling is signaling information that can be shared by a plurality of UEs, and includes at least one piece of information as follows: MIB, SIB, paging information, and random access information.

At block 402, the UE receives the common signaling according to the determined reception mode.

There are two conditions for the common signaling transmission as follows.

Figure 5:
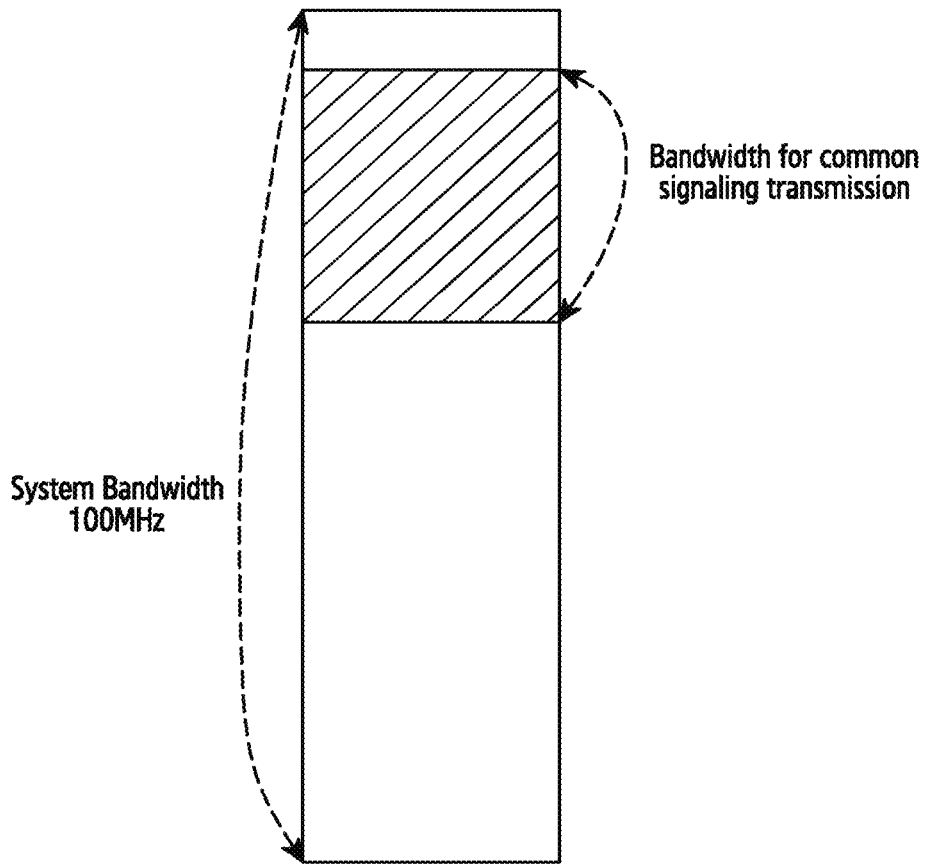
FIG. 5 is a schematic diagram illustrating a first case according to an embodiment of the present disclosure.

In a first condition, one set of the common signaling is transmitted in the system bandwidth, and the set of the common signaling is transmitted in a frequency range of the system bandwidth, as shown in FIG. 5.

Figure 6:
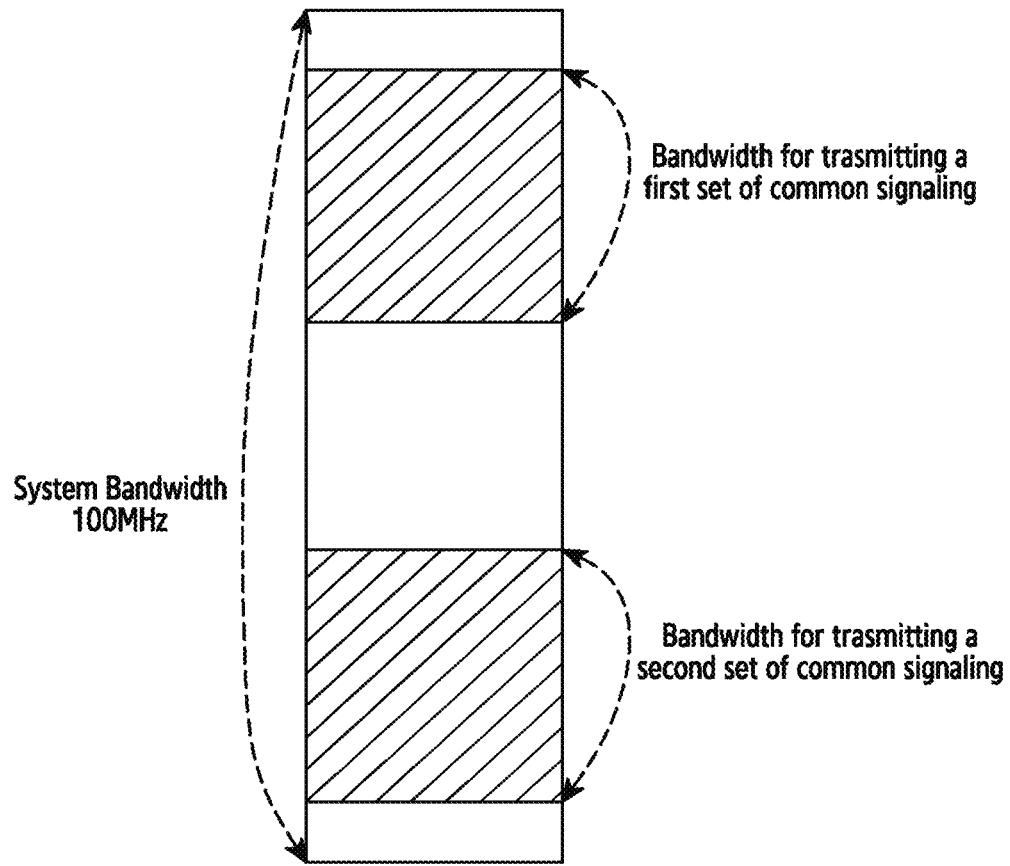
FIG. 6 is a schematic diagram illustrating a second case according to an embodiment of the present disclosure.

In a second condition, at least two sets of the common signaling are transmitted in the system bandwidth, each set of the common signaling is transmitted in a different frequency range of the system bandwidth, and information transmitted through each set of the common signaling is the same, as shown in FIG. 6.

Technical solutions provided according to the present disclosure are further described below in detail through some preferable embodiments. Embodiments 1-3 mainly relate to ways that the UE receives the common signaling in the first condition, and Embodiment 4 is used to describe ways that the UE receives the common signaling in the second condition.

First Embodiment

When the maximum bandwidth supported by the UE is larger than or equal to the system bandwidth (i.e., for the UE able to support information reception throughout the entire system bandwidth), the UE may receive data, UE specific signaling and common signaling on frequency resources in the entire or part of system bandwidth. The UE specific signaling may be received by a specific UE, and the common signaling may be received by all UEs, such as MIB, SIB, and so on. In some cases, the UE specific signaling of some UEs may be the same, thus, the UE specific signaling of these UEs may be delivered as UE shared signaling, where the UE shared signaling refers to signaling can be received by some UEs.

Figure 7:
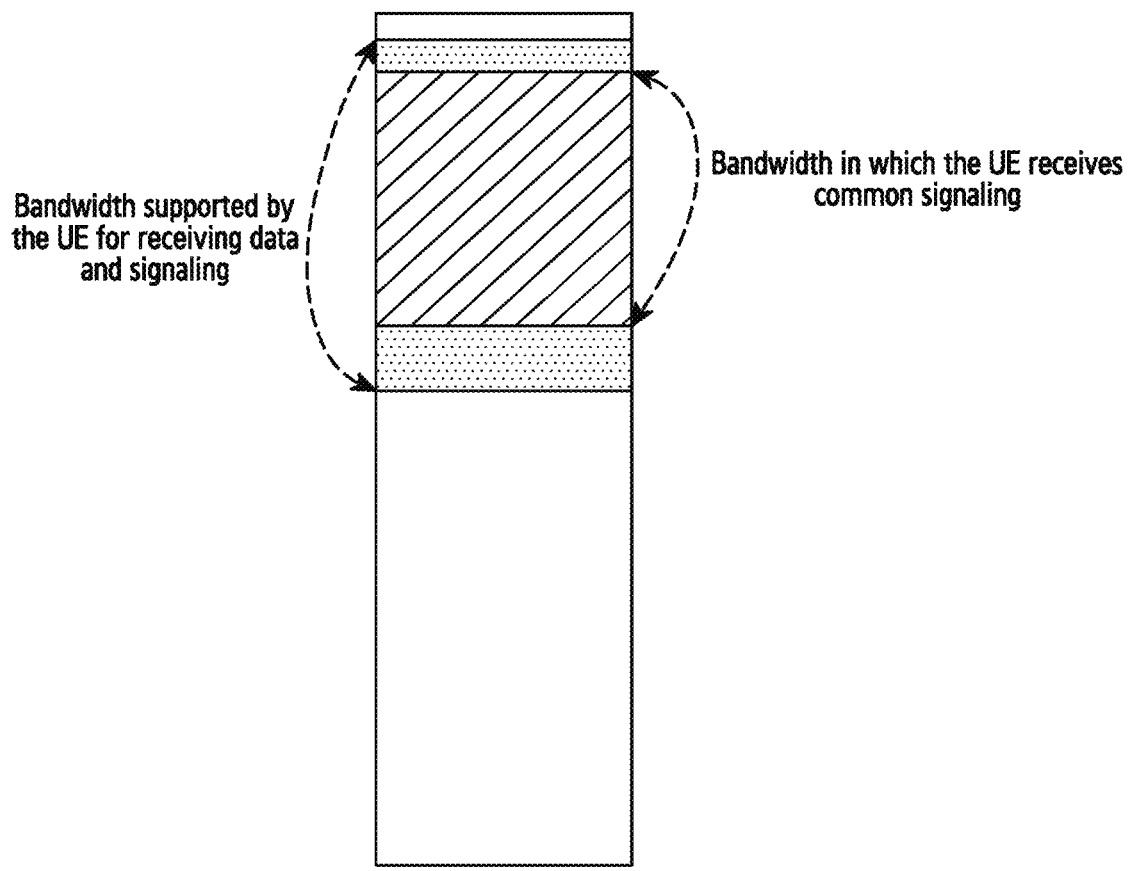
FIG. 7 is a schematic diagram illustrating that a UE receives data or signaling in a frequency resource which includes a frequency band available for common signaling transmission and is within a bandwidth smaller than or equal to the maximum bandwidth supported by the UE according to a first embodiment of the present disclosure.

When the maximum bandwidth supported by the UE is smaller than the system bandwidth (i.e., for the UE able to support information reception in part of the system bandwidth), the UE may receive the data, the UE specific signaling and the common signaling on frequency resources which includes the frequency band available for the common signaling transmission and is within a bandwidth smaller than or equal to the maximum frequency band supported by the UE, that is, the frequency band for the common signaling transmission is entirely contained in the frequency band for the UE data reception, thus, the UE may simultaneously receive data when receiving the common signaling. For example, in a case as shown in FIG. 7, the UE may receive the common signaling, the data and UE specific signaling transmitted from the base station to the UE at the same time, but when the UEs supporting partial bandwidth are a large majority, the data transmission of the UEs may be performed in the frequency band neighbor to the frequency band available for the common signaling transmission, and there is no data transmission in another frequency band, thus, it may be caused that frequency resources outside the part of the bandwidth supported by the UE is wasted.

Second Embodiment

When a maximum bandwidth supported by a UE is larger than or equal to a system bandwidth, the UE may receive data, UE specific signaling and UE common signaling on frequency resources in the entire or part of the system bandwidth.

When the maximum bandwidth supported by the UE is smaller than the system bandwidth, the UE may receive the data, the UE specific signaling and the common signaling on frequency resources which includes the frequency band available for the common signaling transmission and is within a bandwidth smaller than or equal to the maximum frequency band supported by the UE. At this time, the frequency band available for the common signaling transmission are entirely contained in the frequency band for the UE data reception, thus, the UE may simultaneously receive the data and the UE specific signaling when receiving common signaling. A bandwidth and a location of the frequency band for reception of the data and the UE specific signaling may be determined according to specification, or may be determined by receiving higher-layer signaling.

Figure 8:
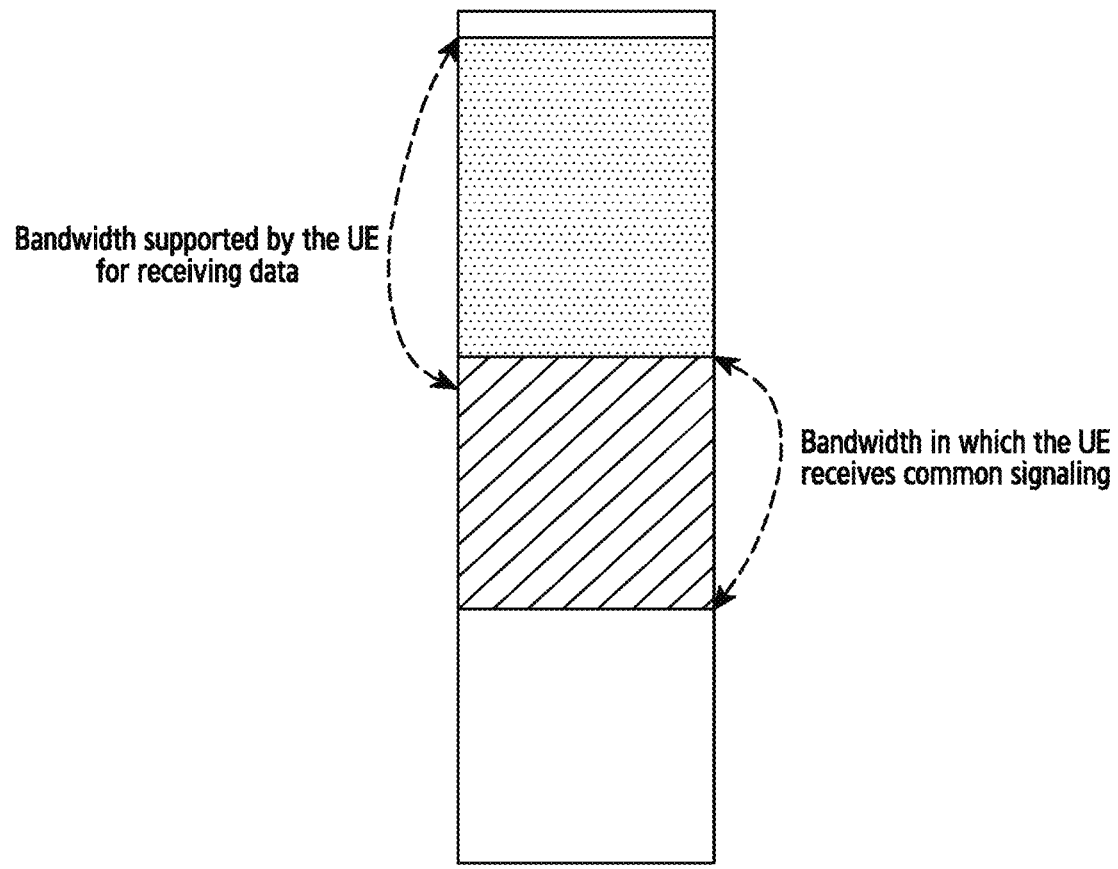
FIG. 8 is a schematic diagram illustrating that a UE receives data in a frequency resource which does not include an entire frequency band available for common signaling transmission and is within a bandwidth smaller than or equal to the maximum bandwidth supported by the UE according to a second embodiment of the present disclosure.

When the maximum bandwidth supported by the UE is smaller than the system bandwidth, the UE may receive the data and the UE specific signaling on frequency resources which does not include the entire frequency band available for the common signaling transmission and is within the bandwidth smaller than or equal to the maximum bandwidth supported by the UE. As shown in FIG. 8, the bandwidth and the location of the frequency band for the reception of the data and the UE specific signaling may be determined according to specifications, or may be determined by receiving higher-level signaling. In this case, since the UE cannot simultaneously work on the frequency band for the data reception and the frequency band for the common signaling reception, the reception of the data and the UE specific signaling and the reception of the common signaling may be performed through time-division multiplexing.

Several preferable methods for performing reception of data and the UE specific signaling and reception of common signaling through time-division multiplexing are provided according to the present disclosure, which are described below.

Figure 9:
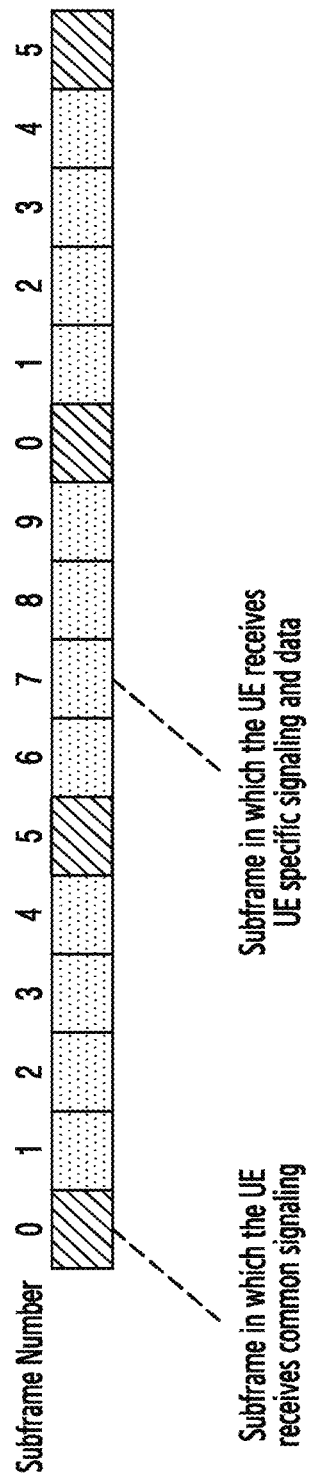
FIG. 9 is a schematic diagram illustrating a first method for receiving data and common signaling through time-division multiplexing according to a second embodiment of the present disclosure.

First Method for Receiving Data and Common Signaling Through Time-Division Multiplexing The UE is configured to receive common signaling in some subframes (corresponding to a first category of subframes in claims) in the frequency band for the common signaling transmission through higher-layer signaling. Since the UE cannot receive the UE specific signaling and the data in the frequency band for transmitting the UE specific signaling and the data (referred to as data transmission band hereinafter) in these subframes, the base station may not transmit the UE specific signaling and the data for the UE in these subframes, and may configure the UE through higher-layer signaling to receive the UE specific signaling and the data in other subframes (corresponding to a second category of subframes in claims) in the frequency bands for the data transmission, as shown in FIG. 9.

According to this method, the UE can perform time-sharing reception of the common signaling, the UE specific signaling and the data, thus, the UE cannot miss the reception of the common signaling sent by the base station, and also cannot miss reception of the UE specific signaling and the data. Since semi-static configuration is used through the higher-layer signaling, it is possible that there is no common signaling transmission in the sub-frame configured for the UE for the common signaling reception, or the transmitted common signaling is not updated, thus, even if there is no common signaling transmission or the transmitted common signaling is not updated in these subframes, the UE still cannot receive UE specific signaling and the data, which may affect the data reception rate of the UE.

Second Method for Receiving Data and Common Signaling Through Time-Division Multiplexing The base station may transmit MIB and/or SIB in some subframes, or may send paging information or random access response information in some subframes, wherein these subframes are subframes available for the common signaling transmission. These subframes are referred to as candidate subframes for the common signaling reception in the present disclosure. The candidate subframes for the common signaling reception include at least one of subframes as follows: a subframe in which the base station transmits MIB, a subframe in which the base station transmits SIB1, a subframe indicated by SIB1 for transmitting another SIB, a subframe configured for UE to transmit paging information by the base station, and a subframe configured for UE to transmit random access response information by the base station.

Figure 10:
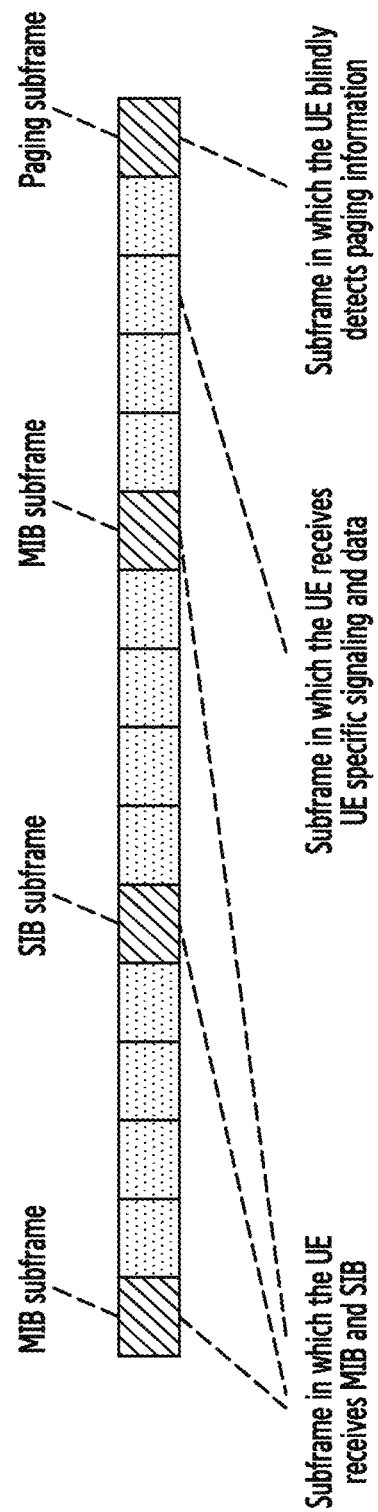
FIG. 10 is a schematic diagram illustrating a second method for receiving data and common signaling through time-division multiplexing according to a second embodiment of the present disclosure.

The UE receives common signaling in the candidate subframes for the common signaling reception in the frequency band for the common signaling transmission. Since the UE cannot receive UE specific signaling and the data in these subframes in the frequency band for the data transmission, the base station may not transmit the UE specific signaling and the data to the UE in these subframes. For example, on the subframes such as the subframe in which the base station transmits MIB and SIB 1, the subframe indicated by SIB1 for transmitting another SIB, and the subframe available for transmitting paging information configured for the UE by the base station, regardless of whether the base station updates the MIB, SIB and whether the base station transmits the paging information, the UE has to receive the MIB, SIB, and has to blindly detect paging information in a corresponding subframe. As shown in FIG. 10, the UE receives the UE specific signaling and the data in a subframe outside the candidate subframes for the common signaling reception in the frequency band for the data transmission.

According to this method, the UE can perform time-sharing reception of the common signaling, the UE specific signaling and the data, thus, the UE cannot miss reception of the common signaling sent by the base station, and also cannot miss the reception of the UE specific signaling and the data. However, when there is no common signaling transmission in the subframe configured for receiving common signaling for the UE, or the transmitted common signaling is not updated in these subframes, the UE still cannot receive the UE specific signaling and data, which may affect the data reception rate of the UE in these subframes.

Third Method for Receiving Data and Common Signaling Through Time-Division Multiplexing The UE receives common signaling in the frequency band for common signaling transmission in the candidate subframe for common signaling reception, and the UE cannot receive UE specific signaling and data in the frequency band for data transmission in these subframes. Thus, in these subframes, the base station may not transmit the UE specific signaling and the data for the UE. For example, the candidate subframes for the common signaling reception include at least one of subframes as follows: the subframe in which the base station transmits MIB and SIB 1, the subframe indicated through SIB 1 for transmitting another SIB, and the subframe available for transmitting paging information configured for the UE by the base station. The UE receives the UE specific signaling and the data in the frequency band for the data transmission in a subframe outside candidate subframes for the common signaling reception. However, it is possible that an information value in subframes for MIB and SIB transmission is not updated, in fact, the UE does not need to receive the MIB and the SIB in these subframes. In addition, in the subframe configured for the paging information transmission, there may be no paging information transmission, thus, the UE does not need to blindly detect the paging information at this time. However, there is no information to inform the UE whether the information value in the subframe for transmitting the MIB and the SIB has been updated, and there is no information to inform the UE whether the paging information is transmitted in the subframe for the paging information transmission. Therefore, regardless of whether the base station updates the MIB and the SIB and whether the base station transmits the paging information, the UE has to receive the common signaling in all the candidate subframes for the common signaling reception. In order to solve this technical problem, the present disclosure provides that the base station transmits some pieces of information to indicate whether the information value in the subframe available for transmitting the MIB and the SIB is updated and whether the paging information is transmitted in the subframe available for the paging information transmission, several preferable indicating method are described below.

The UE receives an information indication (such as physical layer signaling) in the frequency band for the data reception, and decides whether to receive the common signaling in a corresponding subframe in the frequency band for the common signaling transmission, the information indication can also be referred to as a common signaling reception indication. If the UE receives the common signaling in the frequency band for the common signaling transmission, the UE specific signaling and the data may not be simultaneously received.

First Informing Method:

The UE determines the candidate subframes for the common signaling reception by receiving the higher-layer signaling configuration or by specifications. Afterwards, the UE receives the common signaling reception indication in the candidate subframes or in a downlink subframe before the candidate subframes, and determines whether to receive the common signaling according to the received common signaling reception indication.

Figure 11:
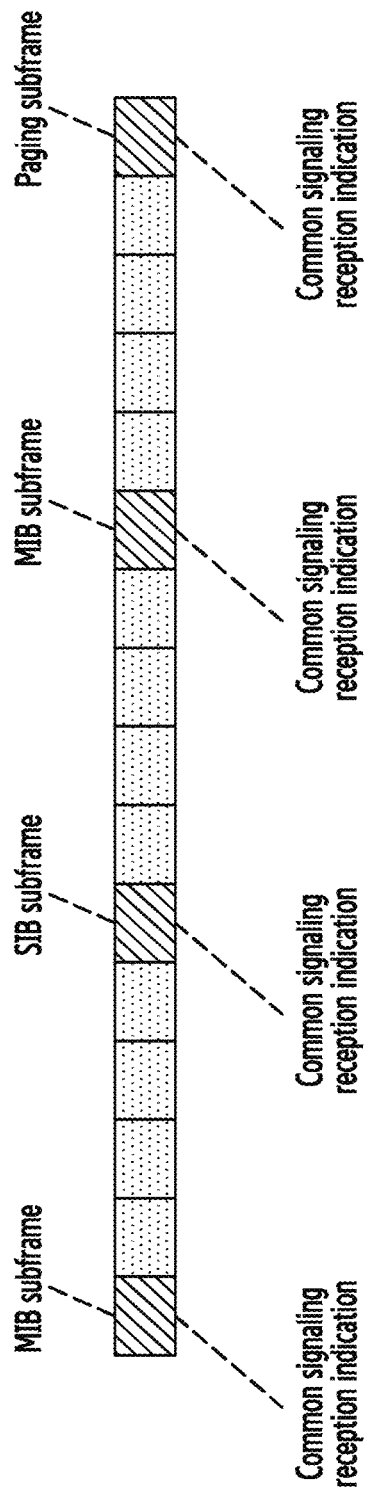
FIG. 11 is a schematic diagram illustrating a first method for obtaining a common signaling reception indication according to a second embodiment of the present disclosure.

A first common signaling reception indication obtaining method includes that the UE receives the common signaling reception indication in the candidate subframe for the common signaling reception, and determines whether to receive the common signaling in the current subframe in the frequency band for the common signaling transmission according to the common signaling reception indication, as shown in FIG. 11.

Figure 12:
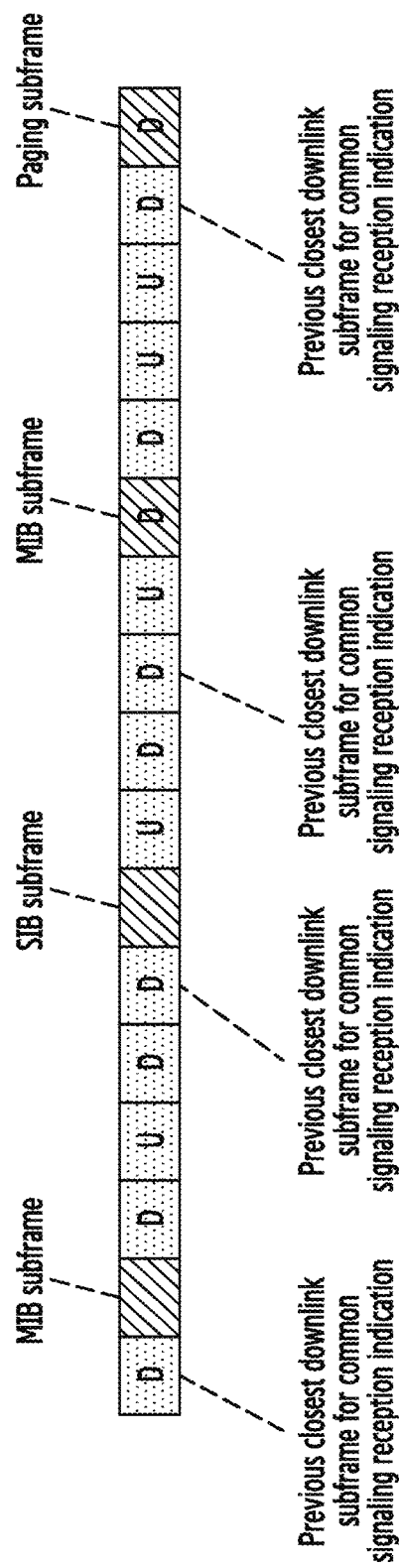
FIG. 12 is a schematic diagram illustrating a second method for obtaining a common signaling reception indication according to a second embodiment of the present disclosure.

A second common signaling reception indication obtaining method includes that the UE receives the common signaling reception indication in the closest downlink subframe before the candidate subframes for the common signaling reception, and according to the common signaling reception indication, the UE decides whether to receive the common signaling in the frequency band for the common signaling transmission in a first candidate subframe for the common signaling reception after the subframe for receiving the common signaling reception indication. As shown in FIG. 12, D represents the downlink subframe, and U represents an uplink subframe.

Figure 13:
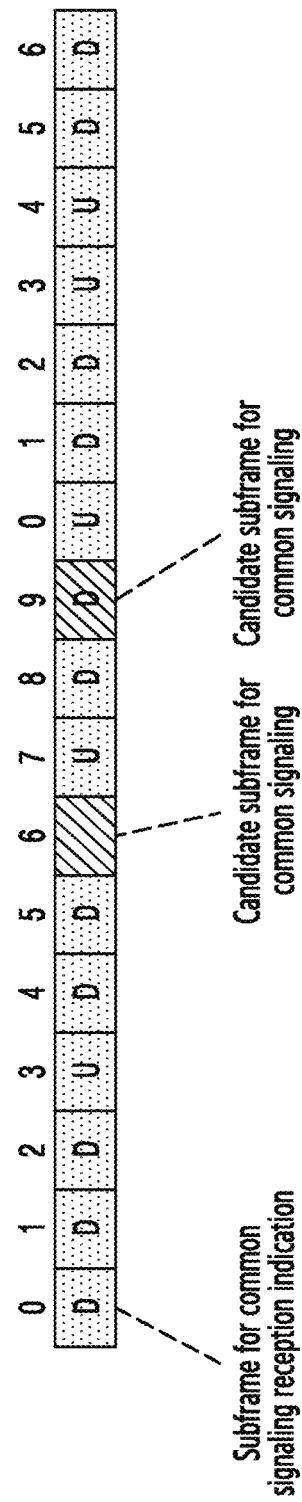
FIG. 13 is a schematic diagram illustrating a third method for obtaining a common signaling reception indication according to a second embodiment of the present disclosure.

A third common signaling reception indication obtaining method includes that the UE is configured with the subframes in which common signaling reception indication is received through higher-layer signaling, according to the common signaling reception indication, the UE decides whether to receive the common signaling in the frequency band for the common signaling transmission in the candidate subframe for the common signaling reception within a time period after the subframe in which the common signaling reception indication is received. As shown in FIG. 13, the UE is configured to receive the common signaling reception indication in a subframe 0 of each radio frame according to the higher-layer signaling, according to the common signaling reception indication, the UE decides whether to receive the common signaling in the candidate subframes (a subframe 6 and a subframe 9) for the common signaling reception from a subframe 1 of a current radio frame to a subframe 0 of a next radio frame.

The common signaling reception indication above may be indicated through a UE specific control signaling. For example, it may be indicated by 1-bit information in control signaling for uplink data scheduling or control signaling for downlink data scheduling (e.g., PDCCH/EPDCCH). Alternatively, the common signaling reception indication may be indicated through control signaling shared by multiple UEs, the multiple UEs may receive the common signaling reception indication. For example, the common signaling reception indication occupies 1-bit information, a value of the common signaling reception indication "0" indicates that the UE does not need to receive the common signaling, and the value of the common signaling reception indication "1" indicates that the UE should receive the common signaling.

In addition, if the UE does not receive the common signaling reception indication in the closest downlink subframe before the candidate subframe for the common signaling reception, i.e., if the UE does not receive the common signaling reception indication in the subframe available for transmitting the common signaling reception indication, a processing is performed according to some methods provided according to the present disclosure below.

A processing method includes that if the UE does not receive the common signaling reception indication, the UE does not need to receive the common signaling. That is, if the base station wants the UE to receive the common signaling, the base station may send the common signaling reception indication to indicate the UE to receive the common signaling; if the base station does not want the UE to receive the common signaling, the base station may send the common signaling reception indication to indicate the UE not to receive the common signaling, or the base station may not send the common signaling to represent that the UE does not need to receive the common signaling reception indication, accordingly, the UE may not receive the common signaling when the UE do not receive the common signaling reception indication, thereby saving the common signaling reception indication, but if the base station transmits the common signaling reception indication but the UE does not receive the common signaling reception indication, the UE may miss the common signaling reception.

Another processing method includes that if the UE does not receive the common signaling reception indication, the UE should receive the common signaling. That is, if the base station wants the UE to receive the common signaling, the base station may send the common signaling reception indication to indicate the UE to receive the common signaling; if the base station does not want the UE to receive the common signaling, the base station has to send the common signaling reception indication to indicate the UE not to receive the common signaling; if the base station does not send the common signaling reception indication, the UE does not receive the common signaling reception indication, and the UE will receive the common signaling, thus, the UE cannot miss the common signaling reception. However, a relatively large number of common signaling reception indications are in demand, because the system information is not updated in most cases and the paging information is not transmitted at most paging occasions.

Second Informing Method:

The UE determines candidate subframes for common signaling receptions by receiving configuration through higher-layer signaling or by specifications. And then the UE receives the common signaling reception indications in candidate subframes or in downlink subframes before the candidate subframes, and determines whether to receive common signaling according to the received common signaling reception indications.

In this method, the common signaling reception indications are divided into categories, different categories of the common signaling reception indications respectively apply to corresponding categories of the common signaling, that is, the common signaling reception indications respectively performs indication for different categories of the common signaling, thus, there are a MIB common signaling reception indication, a SIB common signaling reception indication, a paging common signaling reception indication etc. Different categories of common signaling reception indications are respectively used for determining whether the UE receives corresponding common signaling. For example, the MIB common signaling reception indication determines whether the UE receives MIB in candidate subframes corresponding to the MIB common signaling. The specific informing method is same with the first informing method as described above, differences between the first and second methods are in that the common signaling reception indication is for one kind of common signaling in one second informing method and one common signaling reception indication is for the entire common signaling in the first informing method.

Third Embodiment

When the maximum bandwidth supported by the UE is larger than or equal to the system bandwidth, the UE may receive data, UE specific signaling and UE common signaling on frequency resources in the entire or part of system bandwidth.

When the maximum bandwidth supported by the UE is smaller than the system bandwidth, the UE may receive the data, the UE specific signaling and the common signaling on frequency resources which includes the frequency band available for the common signaling transmission and is within a bandwidth smaller than or equal to the maximum frequency band supported by the UE, that is, the frequency band available for the common signaling transmission are entirely included in the frequency band for the data reception of the UE, thus, the UE may simultaneously receive the common signaling when receiving the data and the UE specific signaling. The bandwidth and the location of the frequency band in which the UE receives the data and the UE specific signaling may be determined according to specifications, or may be determined by receiving higher-layer signaling.

Figure 14:
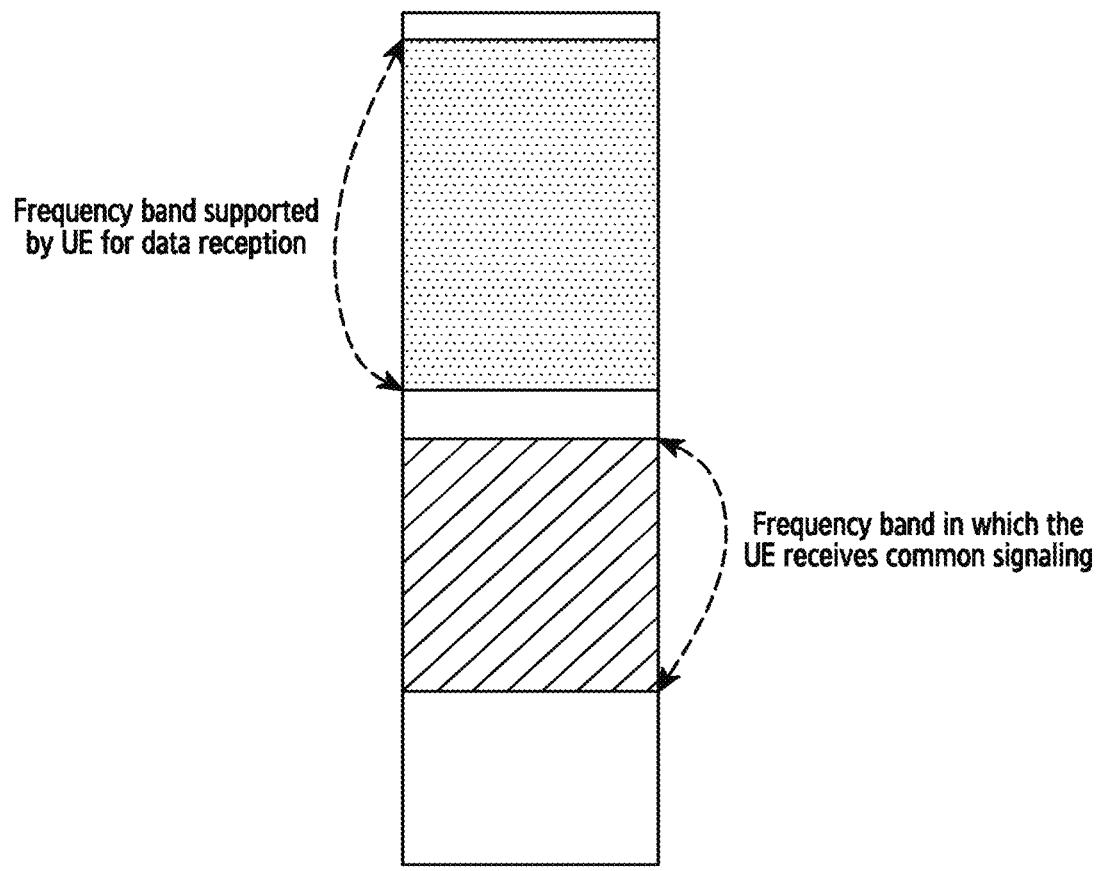
FIG. 14 is a schematic diagram illustrating that a UE receives data in a frequency resource which does not include any part of frequency band available for common signaling transmission and is within a bandwidth smaller than or equal to the maximum bandwidth supported by the UE according to a third embodiment of the present disclosure.

As shown in FIG. 14, when the maximum bandwidth supported by the UE is smaller than the system bandwidth, the UE may receive the data and the UE specific signaling on the frequency resource which does not include any part of the frequency band available for the common signaling transmission and is within the bandwidth smaller than or equal to the maximum bandwidth supported by the UE, the bandwidth and the location of the frequency band in which the UE receives the data and the UE specific signaling may be determined according to specifications, or may be determined by receiving higher-layer signaling. In this case, since the UE cannot simultaneously work in both the frequency band for the data reception and the frequency band for the common signaling reception, the reception of the common signaling and the reception of the data and the UE specific signaling are performed through time-division multiplexing, the detail receiving method is same as the method when the UE receives the data in the frequency resource which does not include the entire frequency band available for the common signaling transmission and is within the bandwidth smaller than or equal to the maximum bandwidth supported by the UE in the second embodiment.

Figure 15:
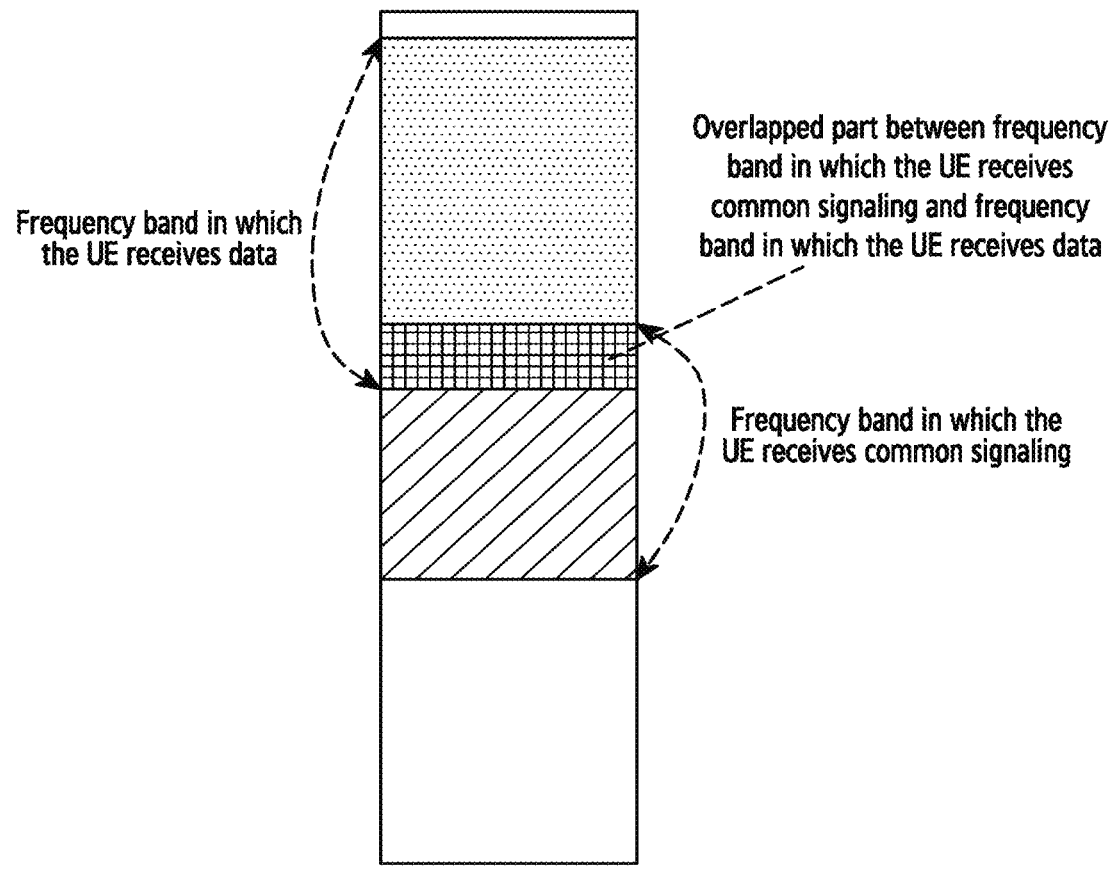
FIG. 15 is a schematic diagram illustrating that a UE receives data in a frequency resource which includes a part of frequency band available for common signaling transmission and is within a bandwidth smaller than or equal to the maximum bandwidth supported by the UE according to a third embodiment of the present disclosure.

When the maximum bandwidth supported by the UE is smaller than the system bandwidth, the UE may receive the data and the UE specific signaling on frequency resources which includes part of the frequency band available for the common signaling transmission and is within the bandwidth smaller than or equal to the maximum frequency band supported by the UE. That is, the frequency band for the UE data reception and the frequency band for the UE common signaling reception are partially overlapped. The bandwidth and the location of the frequency band for the UE data reception may be determined according to specifications, or may be determined by receiving higher-level signaling, as shown in FIG. 15.

In this case, if the common signaling is transmitted in the overlapped frequency band between the frequency band for the data reception and the common signaling reception of the UE, the UE may simultaneously perform the reception of the data and the UE specific signaling and the reception of the common signaling, the detail receiving method is same as the method when the UE receives the data on frequency resources which includes the entire frequency band available for the common signaling transmission and is within the bandwidth smaller than or equal to the maximum frequency band supported by the UE in the second embodiment; if the common signaling is transmitted in the non-overlapped frequency band between the frequency band for the data reception and the common signaling reception of the UE, the UE may not simultaneously perform the reception of the data and the UE specific signaling and the reception of the common signaling, the detail receiving method is same as the method when the UE receives the data on frequency resources which does not include the entire frequency band available for the common signaling transmission and is within the bandwidth smaller than or equal to the maximum frequency band supported by the UE in the second embodiment.

Fourth Embodiment

In this embodiment, the common signaling receiving method in a second case is described. In the second case, at least two sets of common signaling is transmitted in the system bandwidth, each set of the common signaling is transmitted in a different frequency band range in the system bandwidth, and information carried by each set of common signaling is the same.

When the maximum bandwidth supported by the UE is larger than or equal to the system bandwidth (i.e., for the UE able to support information reception in the entire system bandwidth), the UE may receive the data and the UE specific signaling in frequency resources in the entire or part of system bandwidth, and the UE can receive any set of the common signaling.

When the maximum bandwidth supported by the UE is smaller than the system bandwidth, the UE may receive the data and the UE specific signaling in the frequency resource within the bandwidth smaller than or equal to the maximum bandwidth supported by the UE, and the bandwidth and the location of the frequency band for the data reception and the UE specific signaling reception may be determined according to specifications, or may be determined by receiving higher-layer signaling. At this time, the frequency band for the UE data reception includes the frequency band for transmitting at least one set of the common signaling, thus, the UE may simultaneously receive the common signaling when receiving the data. When multiple sets of common signaling is transmitted in the frequency band for the UE data reception, the UE may receive any one set of common signaling.

Figure 16:
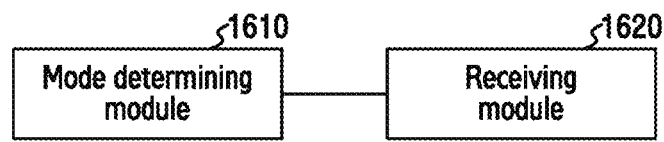
FIG. 16 is a schematic diagram illustrating a structure of a preferable apparatus according to an embodiment of the present disclosure.

Corresponding to methods above, the present disclosure further provides an apparatus. As shown in FIG. 16, the apparatus includes modules as follows.

A mode determining module 1610 is to determine a reception mode of common signaling according to a maximum bandwidth supported by a UE.

A receiving module 1620 is to receive the common signaling according to the determined reception mode.

Figure 17:
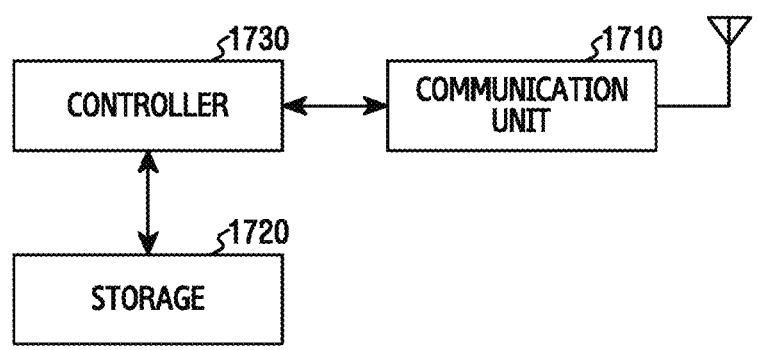
FIG. 17 illustrates an example configuration of a UE in a wireless communication system according to an exemplary embodiment of the disclosure.

FIG. 17 illustrates an example configuration of a UE in a wireless communication system according to an exemplary embodiment of the disclosure. Hereinafter, the term "unit" or the term ending with the suffix "-er" or "-or" refer to a unit for processing at least one function or operation and these terms may be implemented by using hardware or software or a combination of hardware and software.

Referring to FIG. 3, the UE includes a communication unit 1710, a storage 1720, and a controller 1730.

The communication unit 1710 performs functions for transmitting and receiving signals via a radio channel. For example, the communication unit 1710 performs a function of converting between a baseband signal and a bit string according to a physical layer standard of a system. For example, when transmitting data, the communication unit 1710 generates complex symbols by encoding and modulating a transmission bit string. In addition, when receiving data, the communication unit 1710 restores a reception bit string by demodulating and decoding a baseband signal. In addition, the communication unit 1710 up-converts a baseband signal into an RF band signal and then transmit the RF band signal through an antenna, and down-converts an RF band signal received through the antenna into a baseband signal. For example, the communication unit 1710 may include a transmission filter, a reception filter, an amplifier, a mixer, an oscillator, a DAC, an ADC, or the like.

The communication unit 1710 may include a plurality of transmission/reception paths. The communication unit 1710 may include at least one antenna array configured by a plurality of antenna elements. In view of hardware, the communication unit 1710 may be configured by a digital circuitry and an analog circuitry (e.g., radio frequency integrated circuit (RFIC)). Here, the digital circuitry and analog circuitry may be implemented as one package. Also, the communication unit 1710 may include a plurality of RF chain. The communication unit 1710 may perform beamforming.

Also, the communication unit 1710 may include different communication modules for processing signals of different frequency band. The communication unit 1710 may include a plurality of communication modules for supporting a plurality of different wireless access technologies. For example, the plurality of different wireless access technologies may include Bluetooth low energy (BLE), wireless fidelity (Wi-Fi), Wi-Fi gigabyte (WiGig), cellular network (e.g., long term evolution (LTE)), or the like. Also, different frequency bands may include super high frequency (SHF) (e.g., 2.5 GHz, 5 GHz) band and millimeter wave (e.g., 60 GHz).

The communication unit 1710 transmits and receives signals as described above. Accordingly, the communication unit 1710 may be referred to as a transmission interface, a reception interface, a transmission and reception interface, a transmitter, a receiver or a transceiver. In addition, in the following description, transmitting and receiving performed through a radio channel may include processing by the communication unit 1710 as described above. According to exemplary embodiments of the present disclosure, the communication unit 1710 may include the receiving module 1620. Here, the receiving module 1620 may be a command/code resided in the communication unit 1710, storage space that stores the command/code, or a part of circuitry configuring the communication unit 1710.

The storage 1720 stores data such as a basic program for the operation of the UE, an application program, setting information, or the like. The storage 1720 may be configured by a volatile memory, a nonvolatile memory, or a combination of a volatile memory and a nonvolatile memory. In addition, the storage 1720 provides stored data in response to a request of the controller 1730.

The controller 1730 controls overall operations of the UE. For example, the controller 1730 transmits and receives signals through the communication unit 1710. In addition, the controller 1730 records and reads data on and from the storage 1720. The controller 1730 may perform functions of a protocol stack which the communication standard requires. To achieve this, the controller 1730 may include at least one processor or microprocessor or may be a part of the processor. In addition, a part of the communication unit 1710 and the controller 1730 may be referred to as a communication processor (CP). According to exemplary embodiments of the present disclosure, the controller 1730 may include the mode determining module 1610. Here, the mode determining module may be a command/code resided in the controller 1730, storage space that stores the command/code, or a part of circuitry configuring the controller 1730.

According to exemplary embodiments of the present disclosure, the controller 1730 may determine a reception mode of a common signaling based on a maximum bandwidth supported by the UE, and control the communication unit 1710 to receive the common signaling based on the determined reception mode. For example, the controller 1730 may control the UE to perform operations according to the exemplary embodiments of the present disclosure.

The foregoing is only preferred examples of the present disclosure and is not used to limit the protection scope of the present disclosure. Any modification, equivalent substitution and improvement without departing from the spirit and principle of the present disclosure are within the protection scope of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating a user equipment (UE) in a wireless communication system, the method comprising:
   identifying a first band among bands within a bandwidth; and
   receiving, from a base station (BS) in the first band, a first common signaling,
   wherein a second common signaling is transmitted in a second band among the bands, and
   wherein a bandwidth of the first band and a bandwidth of the second band is smaller than the bandwidth.

2. The method of claim 1, wherein the first common signaling and the second common signaling comprise at least one of a system information block, paging information, or random access information.

3. The method of claim 1, further comprising:
   receiving, from the BS in the first band, a first UE specific signaling,
   wherein a second UE specific signaling is transmitted in the second band.

4. The method of claim 1, further comprising:
   receiving data and a UE specific signaling on frequency resources that do not include an entire frequency band available for a common signaling transmission and are within a bandwidth smaller than or equal to a maximum bandwidth supported by the UE, wherein the maximum bandwidth supported by the UE is smaller than a system bandwidth; and
   receiving, the second common signaling, the data and the UE specific signaling through a time-division multiplexing.

5. The method of claim 1, further comprising:
   receiving data and a UE specific signaling on frequency resources that do not include a frequency band available for a common signaling transmission and are within a bandwidth smaller than or equal to a maximum bandwidth supported by the UE, wherein the maximum bandwidth supported by the UE is smaller than a system bandwidth; and
   receiving the second common signaling and the data and the UE specific signaling through a time-division multiplexing.

6. The method of claim 1, further comprising:
   receiving data and a UE specific signaling on frequency resources that include a frequency band available for a common signaling transmission and are within a bandwidth smaller than or equal to a maximum bandwidth supported by the UE, wherein the maximum bandwidth supported by the UE is smaller than a system bandwidth; and
   performing one of:
   a reception of the data and the UE specific signaling in an overlapped part between a frequency band for a UE data reception and a frequency band for a common signaling reception; or
   a reception of the second common signaling and the data and the UE specific signaling through time-division multiplexing.

7. The method of claim 1, wherein the receiving of the first common signaling comprises:
   receiving data, a UE specific signaling and the first common signaling in frequency resources within a bandwidth smaller than or equal to a maximum bandwidth supported by the UE, wherein the maximum bandwidth supported by the UE is smaller than a system bandwidth; and
   receiving the second common signaling in a frequency band for a UE data reception.

8. A method for operating a base station in a wireless communication system, the method comprising:
   transmitting, to a user equipment (UE) in a first band among bands within a bandwidth, a first common signaling; and
   transmitting, to the UE in a second band among the bands within the bandwidth, a second common signaling,
   wherein a bandwidth of the first band and a bandwidth of the second band is smaller than the bandwidth.

9. The method of claim 8, wherein the first common signaling and the second common signaling comprise at least one of a system information block, paging information, or random access information.

10. The method of claim 8, further comprising:
    transmitting, to the UE in the first band, a first UE specific signaling,
    wherein a second UE specific signaling is transmitted in the second band.

11. A user equipment (UE) in a wireless communication system, the UE comprising:
    a transceiver; and
    at least one processor coupled to the transceiver and configured to:
    identify a first band among bands within a bandwidth; and
    receive, from a base station (BS) in the first band, a first common signaling,
    wherein a second common signaling is transmitted in a second band among the bands, and
    wherein a bandwidth of the first band and a bandwidth of the second band is smaller than the bandwidth.

12. The UE of claim 11, wherein the first common signaling and the second common signaling comprise at least one of a system information block, paging information, or random access information.

13. The UE of claim 11, wherein the at least one processor is further configured to:
    receive, from the BS in the first band, a first UE specific signaling,
    wherein a second UE-specific signaling is transmitted in the second band.

14. The UE of claim 11, wherein the at least one processor is further configured to:
    receive data and a UE specific signaling on frequency resources that do not include an entire frequency band available for a common signaling transmission and are within a bandwidth smaller than or equal to a maximum bandwidth supported by the UE, wherein the maximum bandwidth supported by the UE is smaller than a system bandwidth; and receive the second common signaling and the data and the UE specific signaling through a time-division multiplexing.

15. The UE of claim 11, wherein the at least one processor is further configured to:

receive data and a UE specific signaling on frequency resources that do not include a frequency band available for a common signaling transmission and are within a bandwidth smaller than or equal to a maximum bandwidth supported by the UE, wherein the maximum bandwidth supported by the UE is smaller than a system bandwidth, and receive the second common signaling and the data and the UE specific signaling through a time-division multiplexing.

16. The UE of claim 11, wherein the at least one processor is further configured to receive data and a UE specific signaling on frequency resources that include a frequency band available for a common signaling transmission and are within a bandwidth smaller than or equal to a maximum bandwidth supported by the UE, wherein the maximum bandwidth supported by the UE is smaller than a system bandwidth, and wherein the at least one processor is further configured to perform at least one of:

a reception of the data and the UE specific signaling in an overlapped part between a frequency band for a UE data reception and a frequency band for a common signaling reception; or a reception of the second common signaling and the data and the UE specific signaling through time-division multiplexing.

17. The UE of claim 11, wherein the at least one processor is further configured to:

receive data, a UE specific signaling and the first common signaling in frequency resources within a bandwidth smaller than or equal to a maximum bandwidth supported by the UE, wherein the maximum bandwidth supported by the UE is smaller than a system bandwidth, and receive the second common signaling in a frequency band for a UE data reception.

18. A base station in a wireless communication system, the base station comprising:

a transceiver; and at least one processor coupled to the transceiver and configured to:

transmit, to a user equipment (UE) in a first band among bands within a bandwidth, a first common signaling, and transmit, to the UE in a second band among the bands within the bandwidth, a second common signaling, wherein a bandwidth of the first band and a bandwidth of the second band is smaller than the bandwidth.

19. The base station of claim 18, wherein the first common signaling and the second common signaling comprise at least one of a system information block, paging information, or random access information.

20. The base station of claim 18, wherein the at least one processor is further configured to:

transmit, to the UE in the first band, a first UE specific signaling, wherein a second UE specific signaling is further configured for the second band.

* * * * *